3,666,401
TREATMENT OF TEXTILES TO IMPART WRINKLE-RESISTANT AND FIRE-RESISTANT PROPERTIES

Joseph A. Cahill, Philadelphia, and Joseph A. Meyers III, Springfield, Pa., assignors to Atlantic Richfield Company, Philadelphia, Pa.
No Drawing. Filed Dec. 11, 1970, Ser. No. 97,313
Int. Cl. D06m 13/28, 13/54
U.S. Cl. 8—116.2                                                 8 Claims

ABSTRACT OF THE DISCLOSURE

Fire resistance and wrinkle resistance are imparted to cellulosic textile materials without adversely affecting other properties by impregnating the material with an unsymetrical cross-linking agent that contains a vinyl group and a group that is chemically reactive toward cellulosic hydroxy groups, reacting the aforesaid reactive group with the cellulose in the presence of a chemical catalyst without reacting the vinyl groups, washing to remove unreacted chemicals, impregnating with N,N',N''-triallyl phosphoric triamide and co-polymerizing the latter with the vinyl groups of the unsymetrical cross-linking agent by means of high energy ionizing irradiation.

CROSS-REFERENCE TO RELATED APPLICATION

In our patent application Ser. No. 85,815 and filing date Oct. 30, 1970 we disclose a single step fire and wrinkle resistance treatment for cellulosic textile materials comprising applying a composition containing N,N',N''-triallyl phosphoric triamide and thereafter cross-linking by means of heat or ionizing radiation.

BACKGROUND OF THE INVENTION

Field of the invention

This invention relates to a two-step cellulosic textile treatment for both flame resistance and wrinkle resistance at very low add-on levels.

Description of the prior art

U.S. Pat. 3,434,161 of Mar. 25, 1969 to Walsh discloses a two step permanent-crease treatment for cellulosic textile materials which comprises impregnating with a solution of an unsymmetrical cross-linking and crease-proofing agent having a vinyl group and a reactive group capable of reaction with cellulose to form a cellulose ether or ester in the presence of a chemical catalyst without reacting the vinyl group, reacting the reactive group with the cellulose, and, after cutting and shaping the fabric to form garments, treating with high energy ionizing radiation to polymerize the vinyl group of the cross-linking agent. However, Walsh does not show how his process could be modified so as to impart flame-retardancy as well. In fact, one disadvantage to Walsh's process is that when conventional flame retardants are incorporated, they diminish the wrinkle resistance properties.

SUMMARY OF THE INVENTION

We have unexpectedly discovered that by modifying Walsh's process so as to include a certain specific flame retardancy chemical, the wrinkle resistance is not only not diminished but is markedly improved. The present invention comprises treating a cellulosic textile material first with a vinyl substituted cross-linking agent having another function capable of reaction with cellulose to form a cellulose ether or ester, reacting said reactive group with the cellulose, treating with N,N',N''-triallyl phosphoric triallyl phosphoric triamide, and thereafter applying high energy ionizing radiation so as to co-polymerize the vinyl groups of the said vinyl substituted cross-linking agent with the allyl groups of the N,N',N''-triallyl phosphoric triamide.

DETAILED DESCRIPTION OF THE INVENTION AND THE PREFERRED EMBODIMENTS

Textile materials which may be modified include those derived from cellulosic materials such as cotton, linen, rayon, jute, ramie, paper and the like.

As in Walsh, supra, any vinyl substituted cross-linking agent having another function capable of reaction with cellulose and cellulose derivatives, or mixtures of such cross-linking agents can be used. A preferred class of such cross-linking agents includes functional group bearing derivatives of unsaturated acids such as acrylic and methacrylic acid. Cross-linking agents of particular interest include acrylic acid which has a carboxyl group capable of esterification with cellulose, glycidyl acrylate which contains an epoxy group reactive with cellulosic hydroxyl groups, and methylol acrylamide, the methylol groups of which condenses with cellulosic hydroxyl groups under acidic conditions, and vinyl pyrrolidone, the carbonyl group of which reacts with the cellulose.

Most preferred are compounds which contain nitrogen atoms so as to obtain the synergistic effect of nitrogen and phosphorous on flame retardancy.

Cross-linking agents suitable for use in the process of the present invention are unsymmetrical in the sense that in a given cross-linking agent the functional groups present are of widely different reactivities. This difference in reactivities is necessary for use in a two-step process. The cellulose-reactive groups are first reacted with the cellulosic hydroxy groups to yield a fabric having a cellulose backbone and pendant vinyl groups. These pendant vinyl groups are stable, particularly in the presence of a polymerization inhibitor, and will not polymerize spantaneously.

In practicing the process of the present invention, the fabric is impregnated with a solution, usually an aqueous solution, of the unsymmetrical cross-linking agent. The treating solution also contains an acidic catalyst usually in the range of 0.5 to 10.0 wt. percent and preferably in the range of 1 to 3 wt. percent to promote reaction of the unsymmetrical cross-linking agent with the cellulosic hydroxy groups to yield a fabric having pendant vinyl groups. Typical acid actalysts are organic acids such as acetic acid or salts of strong acids and weaker bases. The concentration of the treating solution is adjusted so that the fabric will contain an add-on desirably within the range of 0.5 to 15% by weight of the untreated fabric and preferably within the range of 2 to 6% after the treated fabric has been cured. The term "add-on" refers to the unsymmetrical cross-linking agent that has reacted with the cellulose and remains as an integral chemical part of the fabric after curing and washing to remove any unreacted excess. The curing of the treated textile is carried out by holding the material at temperatures between about 100° C. and about 250° C. for a period of time sufficient to permit the reaction between the textile and the unsymmetrical cross-linking agent to take place. This period of time may range from several hours at low temperature to several minutes at elevated temperatures.

Desirably, the curing is carried out at temperatures within the range of about 130° to 250° C. and preferably at temperatures within the range of about 150° to 180° C. At these temperatures curing times of from 5 to 15 minutes are typical.

The cured fabric containing pendant vinyl groups is washed to remove any unreacted chemicals, dried and then impregnated with a solution, usually an aqueous solution, of N,N',N''-triallyl phosphoric triamide. The doubly impregnated fabric is then dried and subjected to ionizing radiation at room temperature to co-polymerize the N,N',N''-triallyl phosphoric triamide with the pendant vinyl groups of the fabric. The N,N',N''-triallyl phosphoric triamide imparts the fire retardant properties to the fabric due to the synergistic effect of the nitrogen and phosphorous atoms. It is believed that the durable press properties are obtained due to the cross-linking of the pendant vinyl groups by N,N',N''-triallyl phosphoric triamide.

In formulating the textile treating composition the N,N',N''-triallyl phosphoric triamide is desirably included in the formulation in amounts within the range of 1 to 50% by weight of the composition and preferably in amounts within the range of 10 to 20% by weight. The textile treating composition containing the N,N',N''-triallyl phosphoric triamide is applied so as to provide in the textile material an add-on desirably within the range of 1 to 20% by weight of the textile material and preferably within the range of about 5 to 15% by weight after the treated fabric has been cured by radiation and water washed to remove any unreacted excess. After the N,N',N''-triallyl phosphoric triamide is applied, the textile material is dried. The curing is accomplished by treating the material with ionizing radiation before or after cutting the material. The material can be shaped and pressed before cure if desired.

Gamma rays are the preferred form of ionizing radiation. One suitable source of gamma rays is Cobalt 60. Electron accelerators which provide beta rays are also suitable. The amount of radiation employed is preferably sufficient to cause substantially all of the vinyl groups present to co-polymerize with N,N',N''-triallyl phosphoric triamide. The extent of treatment time depends on the energy of the treating source used. The time is adjusted so as to provide from 1 to 5 megarads. The preferred range is 2 to 4 megarads.

After curing, the resulting treated textile materials are highly resistant to wrinkles and are also highly fire-retardant.

The following examples illustrates the details of the invention.

EXAMPLE I

A textile treating bath was formulated to contain 10 wt. percent of N-methylol acrylamide by combining 15.9 parts of an aqueous solution containing 62.9 wt. percent N-methylol acrylamide, 0.5 part of an ethoxylated alkyl phenol as wetting agent, 2.5 parts of ammonium chloride as condensation catalyst, and sufficient water to make a total of 100 parts of treating solution. Swatches of bleached, desized, mercerized cotton print cloth weighing 4 ounces per yard were then padded through this solution and a wet pick-up on the fabric of 100% was obtained. After drying, the treated fabrics were then cured for 15 minutes at 165° C. and then washed under hot water to remove unreacted compound. This resulted in a dry add-on of 6.3 wt. percent. Fabrics containing 3.3 and 4.1 percent add-ons were similarly obtained when treating baths were used which contained 3.3 and 5.0 wt. percent of N-methylol acrylamide respectively, as well as 0.5 wt. perecnt wetting agent and 2.5 wt. percent condensation catalyst.

EXAMPLE II

A treating bath was made by combining 20 parts of N,N',N''-triallyl phosphoric triamide prepared with sufficient water to make a total of 100 parts of treating solution. The fabrics containing various amounts of N-methylol acrylamide prepared in Example I were then padded through this solution and a wet pickup on the fabric of 100% was obtained. After drying, the treated fabrics were then cured at room temperatures by being exposed to a cobalt 60 radiation source with an effective exposure dose rate of 250,000 roentgens per hour. The radiation was carried out in a nitrogen atmosphere until the fabrics were given a total irradiation dosage of 4 megarads. In several cases the irradiation was carried out in an air atmosphere. After irradiation the fabrics were then washed under hot water to remove unreacted N,N',N''-triallyl phosphoric triamide. All the treated fabrics were then tested for fire resistance by the AATCC vertical flame test method (34–1970) and for wrinkle resistance by the AATCC wrinkle recovery angle method (Monsanto) (66–1968). These are standard tests used by the cotton industry.

A 5.5 inch char length is allowable under the flame test standards for the 4.0 ounce per yard cotton fabric used.

In the following table, results for seven experiments are presented.

| Experiment | Weight percent add-on | | | Irradiation | | Vertical test, char length, inches | Wrinkle recovery angle, W+F, degrees |
| --- | --- | --- | --- | --- | --- | --- | --- |
| | N-methylol acrylamide | N,N',N''-triallyl phosphoric triamide | Total | Atmosphere | Mrads. | | |
| A | 3.4 | 11.9 | 15.3 | $N_2$ | 4.0 | 4.3 | 285 |
| B | 3.4 | 11.9 | 15.3 | Air | 4.0 | 3.1 | 284 |
| C | 4.2 | 13.5 | 17.7 | $N_2$ | 4.0 | 2.9 | 303 |
| D | 4.0 | 13.3 | 17.3 | Air | 4.0 | 2.9 | 300 |
| E | 6.3 | 9.9 | 16.2 | $N_2$ | 4.0 | 5.0 | 320 |
| F | 0.0 | 4.0 | 4.0 | $N_2$ | 4.0 | (1) | 190 |
| G | 0.0 | 0.0 | 0.0 | | | (1) | 190 |

[1] Burned entire length.

It can be seen that the cotton pretreated with 3.4, 4.2 and 6.3 wt. percent N-methylol acrylamide induced polymerization of the N,N',N''-triallyl phosphoric triamide to about the same extent since the total add-ons ranged from about 15 to 17.5 wt. percent.

The irradiated fabric which was pretreated with 3.4 wt. percent N-methylol acrylamide (Exp. A) passed the vertical flame test (char length=4.3 inches) and also had excellent wrinkle resistant properties as the dry wrinkle recovery angle (W+F) was 285°. Although fabric treated by prior durable press processes would have wrinkle recovery angles in this range, it would not pass the vertical flame test.

The irradiated fabrics pretreated with just slightly higher amounts of N-methylol acrylamide of 4.2 and 6.3 wt. percent (Experiments C and E) had even better wrinkle-resistant properties as their wrinkle recovery angles were 303° and 320° respectively. These also passed the vertical flame test. There was no detectable difference between the hand of the irradiated fabrics and the hand of the untreated fabric.

A comparison of Exp. A with B and of C with D shows that comparable results are obtained when the irradiation cure is carried out in an atmosphere of nitrogen or air.

In Experiment F a piece of untreated cotton was impregnated with the N,N',N''-triallyl phosphoric triamide treating solution to a wet add-on of 100%, dried, and then irradiated in a nitrogen atmosphere to a total dosage of 4 megarads. After washing to remove unreacted compound and drying, the irradiated fabric had a dry add-on of 4.0 wt. percent, failed the vertical flame test and had no improved wrinkle-resistant properties. This shows that the pretreatment with N-methylol acrylamide is necessary in order to induce polymerization of N, N', N''-triallyl phosphoric triamide to such an extent so as to give flame-resistant properties. The N-methylol acrylamide is also needed to give the extent of cellulose cross-linking necessary for good wrinkle resistant properties.

Prior art textile fabric flame-resistance treatments normally require such high add-ons that other properties of the fabric are adversely effected. It was often difficult to impart fire resistance with fabrics of less than about 7 ounces per yard especially without causing an undesirable increase in the stiffness of the fabric. It was also difficult to impart to any fabric an appreciable increase in both wrinkle resistance and flame resistance.

The following example illustrates this problem with prior art textile treatments.

EXAMPLE III (Comparative)

A treating bath was formulated to contain 8.3 weight percent of N-methylol acrylamide (NMA) by combining 13.2 parts of a 63.5 weight percent NMA aqueous solution, 0.5 part of a wetting agent, 2.5 parts of ammonium chloride as condensation catalyst, and sufficient water to make a total of 100 parts of treating solution. Two pieces of bleached, desized, mercerized cotton print cloth (weight 4 oz. per yard) were passed through this solution and a wet pick up on the fabric of 100 percent was obtained. After drying, the treated fabrics were cured for 15 minutes at 165° C. and then washed under hot water to remove unreacted compound. This resulted in a dry add-on of 5.3 and 5.5 weight percent.

One of the above NMA treated fabrics was further treated with an aqueous solution containing 20 weight percent of tetrakis-hydroxymethyl phosphonium chloride (THPC) and a wet pick up on the fabric of 100 percent was obtained. The treated fabric was then dried at 85° C. THPC is a well known flame retardant for cellulosic materials, but is outside of our invention.

The NMA treated fabric and the NMA-THPC treated fabric were then cured by being exposed to a cobalt 60 radiation source with an effective exposure dose rate of 250,000 roentgens per hour. The radiation was carried out in a nitrogen atmosphere until the fabrics were given a total dosage of 4 Mrads. After irradiation the fabrics were washed under hot water to remove unreacted compounds, dried, and tested for wrinkle resistance and fire resistance.

The NMA treated fabric (5.3 weight percent add-on) had good durable press properties as the wrinkle recovery angle was 284°. However, it failed the flame test. The NMA-THPC treated fabric had a reduced wrinkle recovery angle of only 250° and failed the flame test. The total add-on was 8.8 weight percent.

These experiments show that both durable press and flame retardant properties cannot be imparted to cotton simply by treatment with compounds that are known to give these properties when used individually. Furthermore, after-treatment with a flame retardancy chemical lowered the wrinkle resistance of the textile material pretreated with a durable press chemical.

In the present invention a process is described in which a treated fabric has flame-resistant properties as well as exceptionally good wrinkle-resistant properties with no increase in the stiffness of the fabric. The add-on required to impart these properties is in the range normally required to give only fire-resistant properties.

Variations and modifications should become apparent without departing from the spirit and scope of the invention.

We claim:

1. A process for imparting flame retardance and wrinkle resistance to cellulosic textile materials comprising
   (a) impregnating the textile material with a solution of an unsymmetrical cross-linking agent having a vinyl group and a reactive group capable of reaction with cellulose to form a cellulose ether or ester in the presence of a chemical catalyst,
   (b) reacting said reactive group with the cellulose textile material,
   (c) washing the fabric to remove unreacted chemicals,
   (d) impregnating the product of step (c) with a solution containing a flame retardancy agent comprising N,N',N''-triallyl phosphoric triamide,
   (e) co-polymerizing the vinyl groups of the cross-linking agent with the allyl groups of the flame retardancy agent by means of high energy ionizing radiation so as to impart chemically bound flame retardancy and wrinkle resistance.

2. The method of claim 1 wherein the cellulosic textile material contains cotton.

3. The method of claim 1 wherein the cross-linking agent is N-methylol acrylamide.

4. The method of claim 1 wherein said irradiation is conducted in the absence of oxygen.

5. The method of claim 1 wherein the solution containing the flame retardancy agent comprises from 1 to 50 weight percent N,N',N''-triallyl phosphoric triamide, and the remainder water.

6. The method of claim 1 wherein the source of ionizing radiation is a cobalt 60 radiation source with an effective exposure rate of from about 200,000 to about 300,000 roentgens per hour.

7. The method of claim 1 wherein the add-on level of the cross-linking agent is in the range of from about 2 to 6 weight percent and the add-on level of the flame retardancy agent is from about 5 to about 15 weight percent.

8. A method for imparting flame retardance and wrinkle resistance to cotton-containing textile fabrics comprising,
   (a) impregnating the fabric with an aqueous solution containing N-methylol acrylamide and acidic catalyst,
   (b) curing the impregnated fabric at from about 150° C. to about 180° C. for from about 5 to about 15 minutes,
   (c) washing and drying the fabric,
   (d) impregnating the fabric with an aqueous solution containing N,N',N''-triallyl phosphoric triamide,
   (e) drying, and
   (f) irradiating the fabric with a source of gamma rays.

References Cited
UNITED STATES PATENTS

| 3,434,161 | 3/1969 | Walsh | 8—116.3 |
| 3,540,835 | 11/1970 | Marco | 8—116.3 |

DONALD LEVY, Primary Examiner

J. CANNON, Assistant Examiner

U.S. Cl. X.R.

8—116.3, 120, DIG 18, 116 P; 38—144; 2—243; 106—15 FP; 117—136